(12) United States Patent
Nelson et al.

(10) Patent No.: US 11,228,522 B2
(45) Date of Patent: Jan. 18, 2022

(54) ANALYSIS OF NETWORK PERFORMANCE USING DETERMINISTIC DECENTRALIZED SCHEDULING ACROSS DISTRIBUTED TEST AGENTS

(71) Applicant: NetScout Systems Texas, LLC, Plano, TX (US)

(72) Inventors: Benjamin Nelson, Colorado Springs, CO (US); Robert Vogt, Colorado Springs, CO (US)

(73) Assignee: NetScout Systems Texas, LLC, Plano, TX (US)

( * ) Notice: Subject to any disclaimer, the term of this patent is extended or adjusted under 35 U.S.C. 154(b) by 0 days.

(21) Appl. No.: 17/003,389

(22) Filed: Aug. 26, 2020

(65) Prior Publication Data

US 2021/0111982 A1   Apr. 15, 2021

Related U.S. Application Data

(60) Provisional application No. 62/914,156, filed on Oct. 11, 2019.

(51) Int. Cl.
*H04L 12/26*   (2006.01)
*G06F 11/36*   (2006.01)

(52) U.S. Cl.
CPC .......... *H04L 43/50* (2013.01); *G06F 11/3688* (2013.01); *H04L 43/04* (2013.01); *H04L 43/12* (2013.01)

(58) Field of Classification Search
CPC ....... H04L 1/0048; H04L 43/50; H04L 47/50; H04L 12/1881; G06F 11/3688; G06F 11/3664; G06F 11/3684
See application file for complete search history.

(56) References Cited

U.S. PATENT DOCUMENTS

| | | | |
|---|---|---|---|
| 2007/0039004 A1* | 2/2007 | Guralnik | G06F 9/5061 718/104 |
| 2019/0065349 A1* | 2/2019 | Sharma | G06F 11/3688 |
| 2019/0065352 A1* | 2/2019 | Patel | G06F 11/3688 |

* cited by examiner

*Primary Examiner* — Chirag R Patel
(74) *Attorney, Agent, or Firm* — Locke Lord LLP; Scott D. Wofsy; Christopher J. Capelli

(57) ABSTRACT

A method and system for testing of a communication network utilizing a plurality of test agents in the communication network using a deterministic decentralized scheduling of the plurality of test agents to test a single network service. Determining an optimal time period for executing a test of the single network service by each of the plurality of test agents without requiring global knowledge of the system and without requiring centralized coordination of individual agent test schedules.

4 Claims, 6 Drawing Sheets

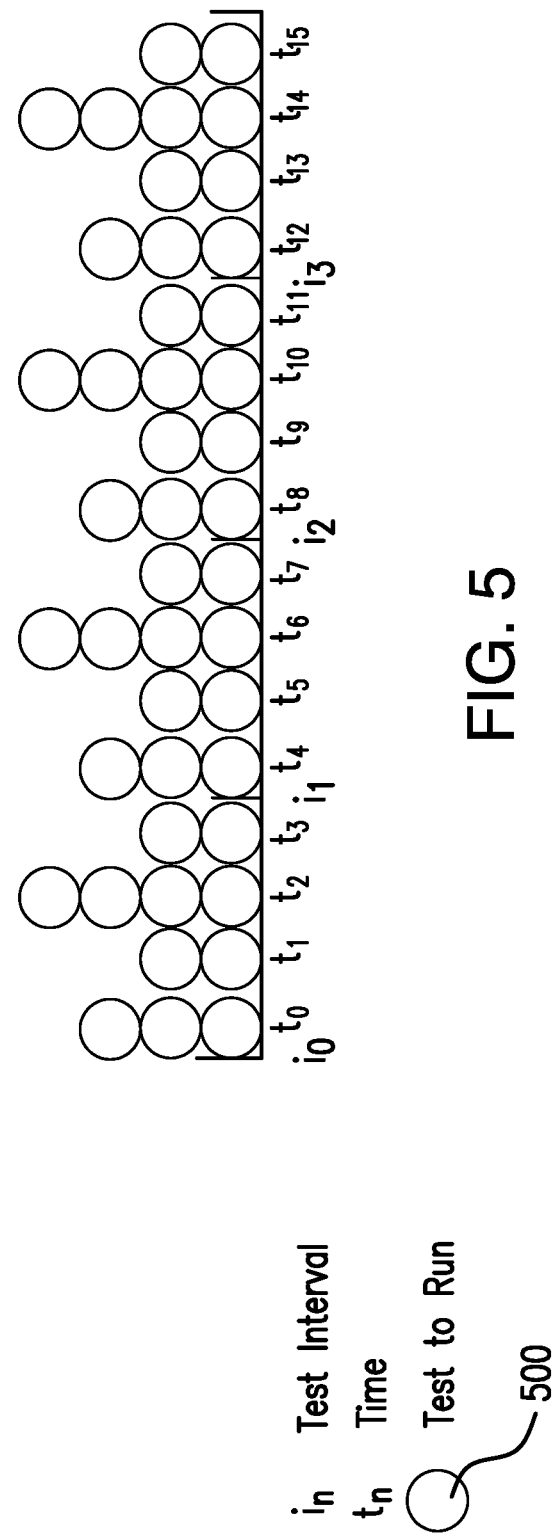

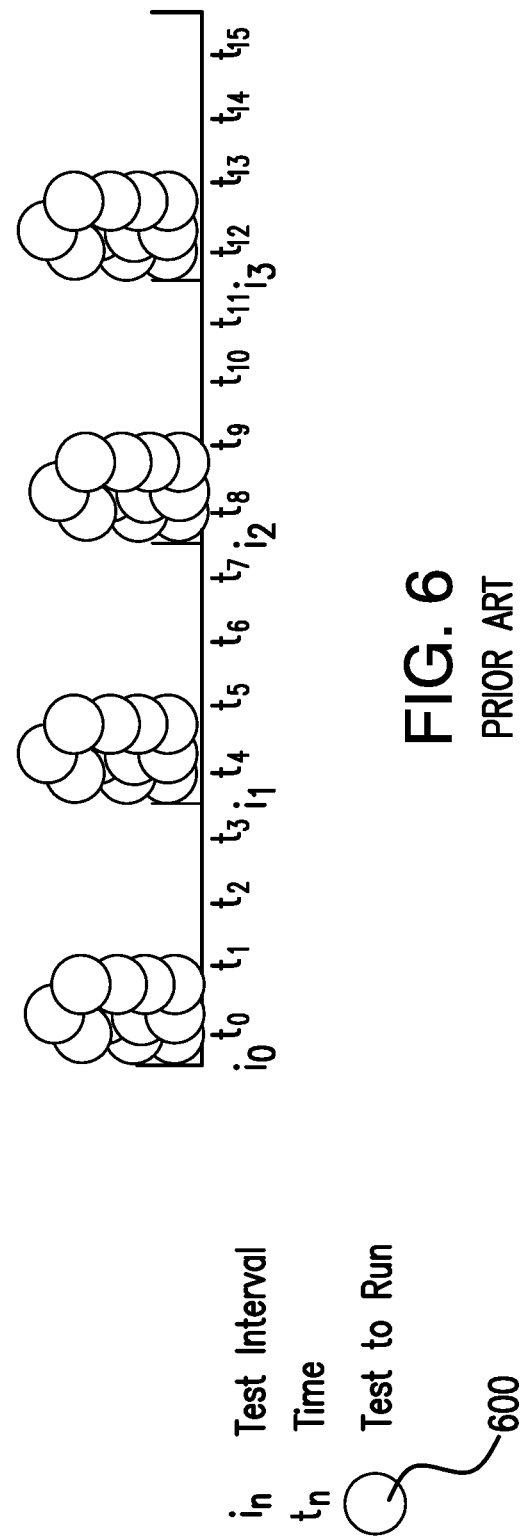

ANALYSIS OF NETWORK PERFORMANCE USING DETERMINISTIC DECENTRALIZED SCHEDULING ACROSS DISTRIBUTED TEST AGENTS

CROSS REFERENCE TO RELATED APPLICATIONS

This application claims priority to U.S. Patent Application Ser. No. 62/914,156 filed Oct. 11, 2019 which is incorporated herein by reference in its entirety.

FIELD OF THE INVENTION

The present invention relates generally to communication networks, and specifically to testing in communication networks using deterministic decentralized scheduling of test agents.

BACKGROUND OF THE INVENTION

Communication networks are in wide use in many technological fields including distributed computing, data exchange and telecommunication applications. Communication networks generally include many nodes, such as bridges, LAN switches, routers, cross-connections and telephone switches. The networks further include communication links, such as cables, point-to-point radio connections and optical fibers, which connect the nodes. The networks also include ports, generally within some of the nodes, for attaching external devices such as computers, terminals, handsets, and multiplexers. These external devices are referred to as end-points, or hosts.

Networks are becoming increasingly complex, especially due to their increasing speeds of operation, the number of units interconnected by a network and the formation of large networks from different types of sub-networks. In addition, networks may transmit concurrently various types of data, such as text, voice, video and other multimedia files. In order to allow for these different types of data, some networks are designed to provide different amounts of bandwidth and different levels of quality of service.

A major issue in both newly-deployed and existing communication networks is testing and trouble-shooting, i.e., checking whether the network is operating according to its specifications and, if not, determining the cause of the network's inadequate performance (for example, the identity of a faulty unit). Dedicated point-to-point testing equipment is a commonly used network-testing tool. Usually, dedicated point-to-point testing equipment requires two users to coordinate their operations in order to identify a misbehaving component of the network. To test a large network, the testing equipment must be moved between many ports of the network.

It is to be appreciate that prior art distributed hardware or software test agents, which performed active testing against a System or Service often suffered from a condition known as the "Thundering Herd" problem. That is, the more test locations that a tester would execute a test from, the more artificial testing load would be imposed on the system/service under test. This testing load often altered the performance of the system/service, and therefore skewed the results. Additionally, certain events, like test configuration changes or system re-starts would often cause the test agents to run tests simultaneously, materially skewing results and potentially overloading the system/service. Therefore, distributed testing from a large number of test agents typically required complex coordination amongst the test agents to spread the testing load across the agents for the duration of the testing interval. This coordination would minimize the artificial testing impact on the system/service under test, thereby providing the most reliable results.

It is noted previous attempts for implementing coordination amongst the test agents to spread the testing load across the agents for the duration of the testing interval included providing centralized coordination where a coordinator would determine which time window each test agent would perform their test and then propagate that information to each test agent. Another attempt included providing decentralized coordination where each test agent would communicate with other agents to determine which test agent would perform their test next.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a software driven mechanism whereby each test agent is operable and configured to determine an optimal time period for executing a test without requiring global knowledge of the system, such as which other network test agents are executing a same or similar test, and/or the other network test agents will execute a test is described. The illustrated embodiments preferably utilize a deterministic decentralized scheduling of test agents, which obviates the need for requiring centralized coordination of individual agent test schedules. In the illustrated embodiments, each test agent is configured and operable to determine a safe test schedule using: 1) a unique identifier for each test agent; and 2) a unique identifier for the test to be executed. Utilizing the aforesaid information (i.e., 1) a unique identifier for each test agent; and 2) a unique identifier for the test to be executed) each test agent determines, with preferably a high degree of certainty, a time to execute a test on a Service in a network without overloading the Service under test.

BRIEF DESCRIPTION OF THE DRAWINGS

The accompanying appendices and/or drawings illustrate various non-limiting, example, inventive aspects in accordance with the present disclosure:

FIG. 5 illustrates the testing of a plurality of network services by an individual network test agent in accordance with the illustrated embodiments; and FIG. 6 illustrates the testing of a plurality of network services by an individual network test agent in accordance with prior art methods.

DETAILED DESCRIPTION OF CERTAIN EMBODIMENTS

Figure 1:
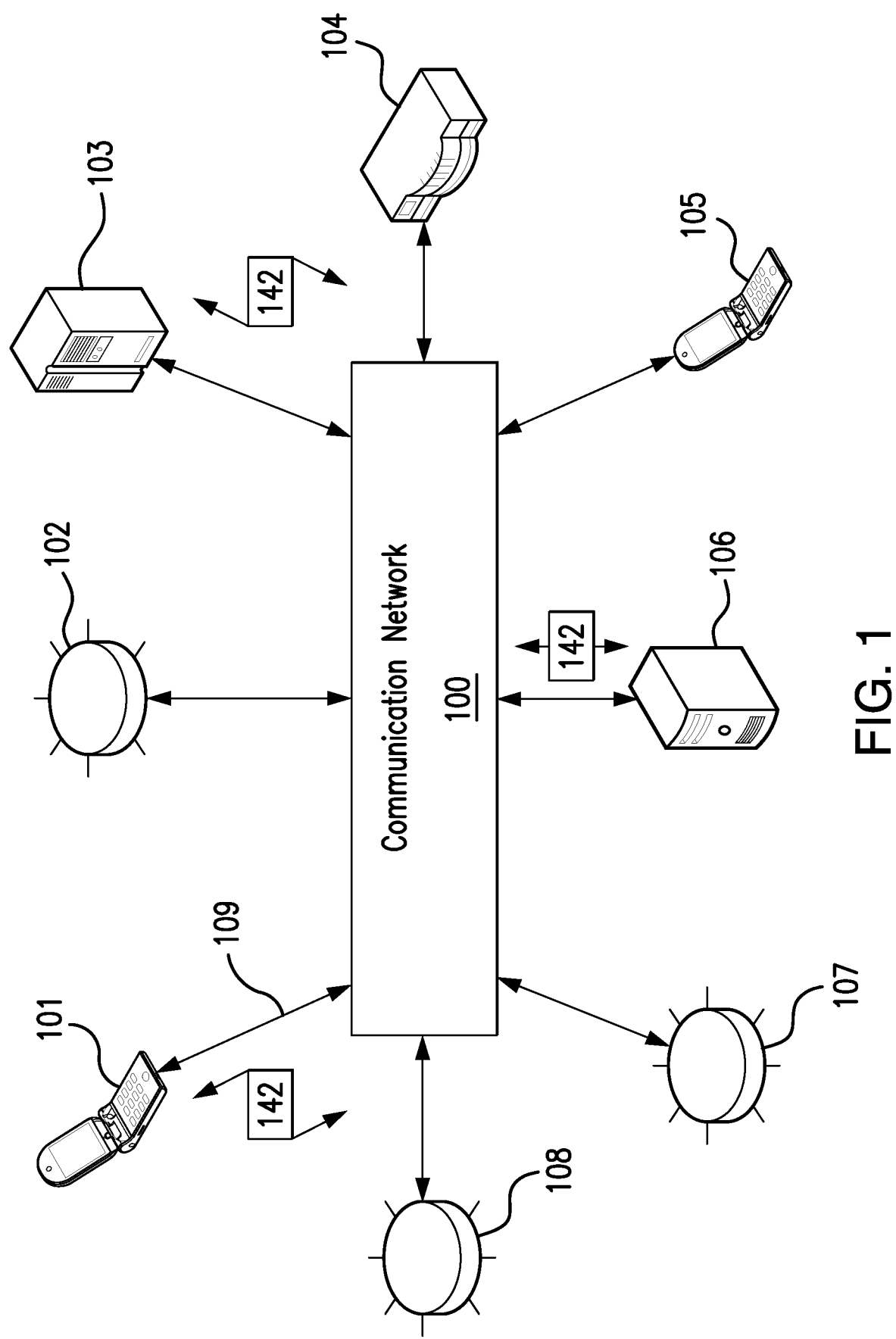
FIG. 1 illustrates an example communication network used in accordance with the illustrated embodiments.

The illustrated embodiments are now described more fully with reference to the accompanying drawings wherein like reference numerals identify similar structural/functional features. The illustrated embodiments are not limited in any way to what is illustrated, as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding both of those included limits are also included in the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, workstations, smart phone devices, tablets, televisions and sensors and/or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, network probe computing devices 103 and 106, smart phone devices 105, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

In accordance with the illustrated embodiments, the network probes 103, 106 having test agent operability for testing one or more network services (as described herein) may consist of an NGENIUS COLLECTOR, NGENIUS PROBE or NGENIUS INFINISTREAM ("ISNG device"), available from NetScout Systems, Inc. of Westford, Mass. For ease of illustration, only two network probes 103, 106 are shown coupled to the network 100 which is to have one or more services (e.g., FTP services, client internal services, etc.) tested in accordance with the illustrated embodiments. However, it is to be understood any number of network probes may be coupled to the network 100 in accordance with the teachings herein for testing one or more network services.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
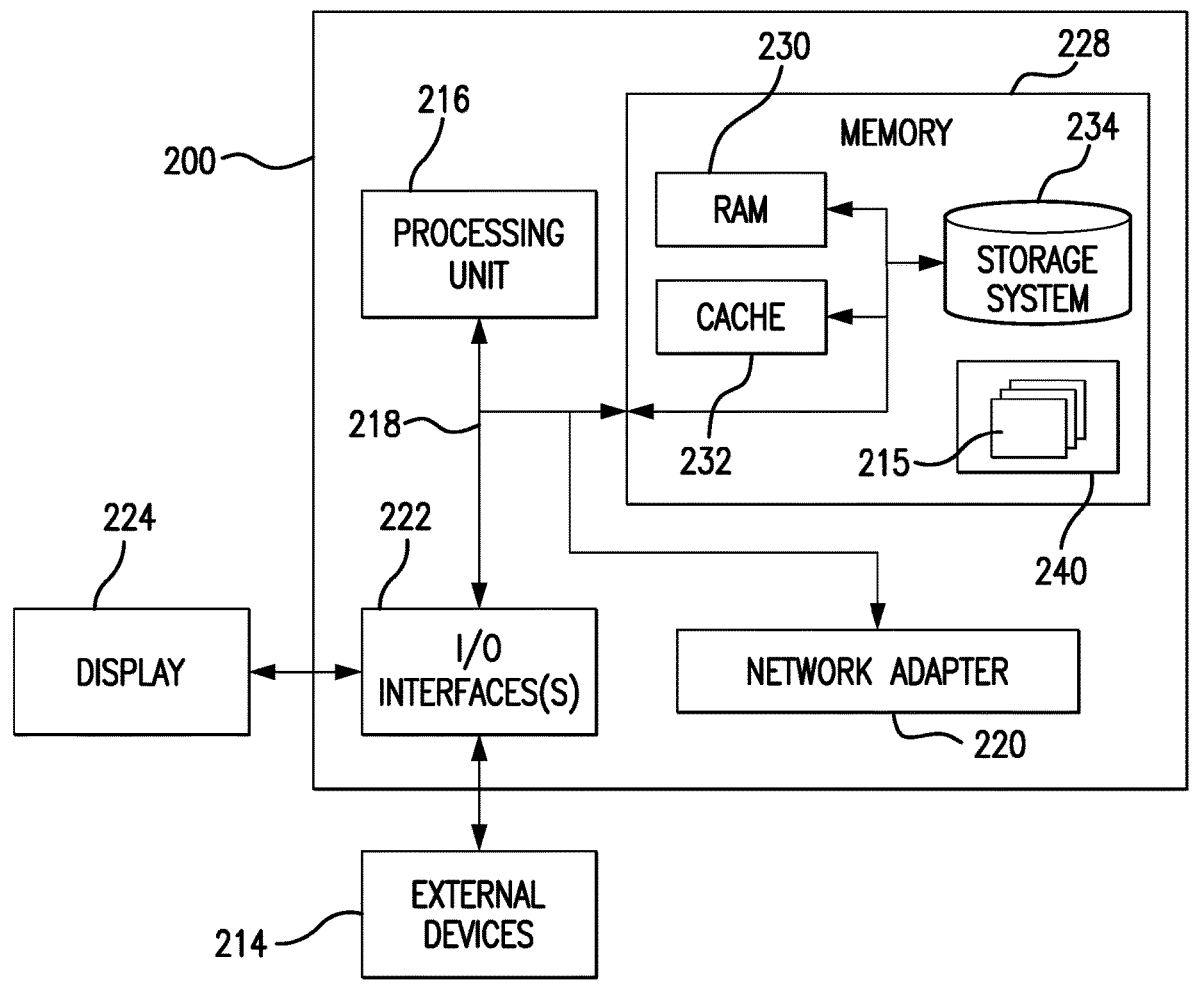
FIG. 2 illustrates an example network test agent nodal device utilized in the network of FIG. 1 in accordance with the illustrated embodiments.

FIG. 2 is a schematic block diagram of an example network computing device 200 (e.g., network probes test agents 103, 106) that may be used (or components thereof) with one or more embodiments described herein, e.g., as one of the nodal devices shown in the network 100. As explained above, in different embodiments these various devices are configured to communicate with each other in any suitable way, such as, for example, via communication network 100.

Device 200 is intended to represent a computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With the exemplary communication network 100 (FIG. 1) and computing device 200 (FIG. 2) being generally shown and discussed above, description of certain illustrated embodiments of the present invention will now be provided. With reference now to FIGS. 3-6, certain illustrated embodiments regarding network test probes/agents (e.g., 103, 106) will now be described. It is to be appreciated, and as mentioned above, each network test probe/agent (e.g., 103, 106) preferably includes software enabling each network test probe/agent (103, 106) to be operable and configured to determine an optimal time period for executing a test, preferably upon a service provided by the network, without requiring global knowledge of the system 100, such as which other network test probes/agents (103, 106) is executing a same or similar test.

Each network test probe/agent (103, 106) preferably includes software instructions providing deterministic decentralized scheduling of the network test probes/agents, which obviates the need for requiring centralized coordination of the test schedules for individual network test probes/agents (103, 106). In accordance with the illustrated embodiments, each network test agent/probe (103, 106) is configured and operable to determine an optimal test schedule using: 1) a unique identifier for each network test agent/probe (103, 106); and 2) a unique identifier for the test to be executed. Utilizing the aforesaid information, each network test agent/probe (103, 106) determines an optimal time to execute a test on a certain network service without overloading the service under test. That is, in accordance with the illustrated embodiments, a software algorithm is preferably deployed in network test agents/probes (103, 106) enabling each network test agent/probe (103, 106) to calculate a test schedule, independent of centralized control or communication with other network test agents/probes (103, 106), that results in traffic from the aggregate set of network test agents/probes (103, 106) to be distributed across a test interval. It is to be appreciated that additional network test agents/probes (103, 106) may be added to the system/network 100 without the need to recalculate the test schedule for the existing network test agents/probes (103, 106). Thus computing resources are not expended on repeated schedule recalculation and the test results are not impacted by overloading a test target.

Figure 3:
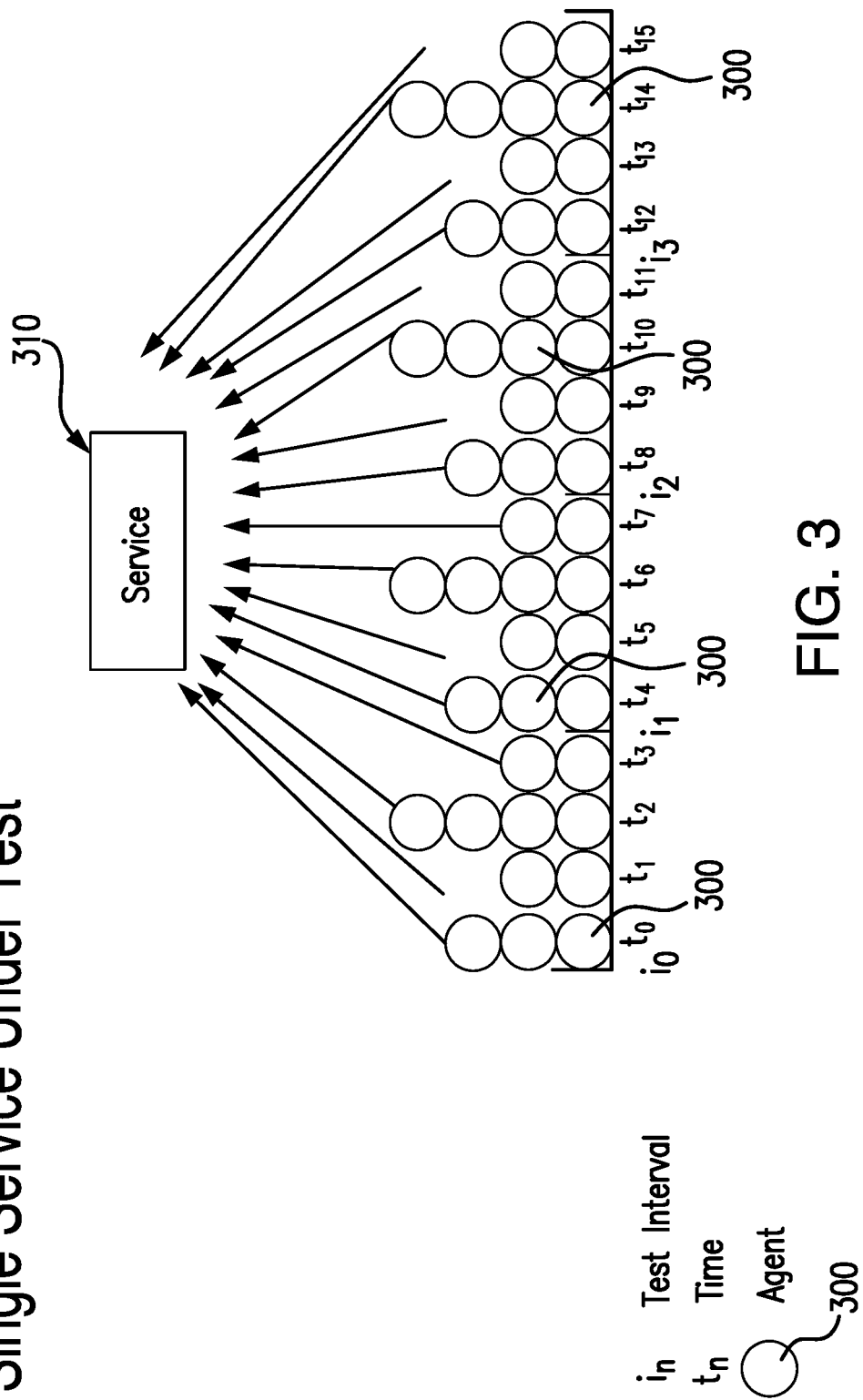
FIG. 3 illustrates the testing of a single network service by a plurality of network test agents in accordance with the illustrated embodiments.
Figure 4:
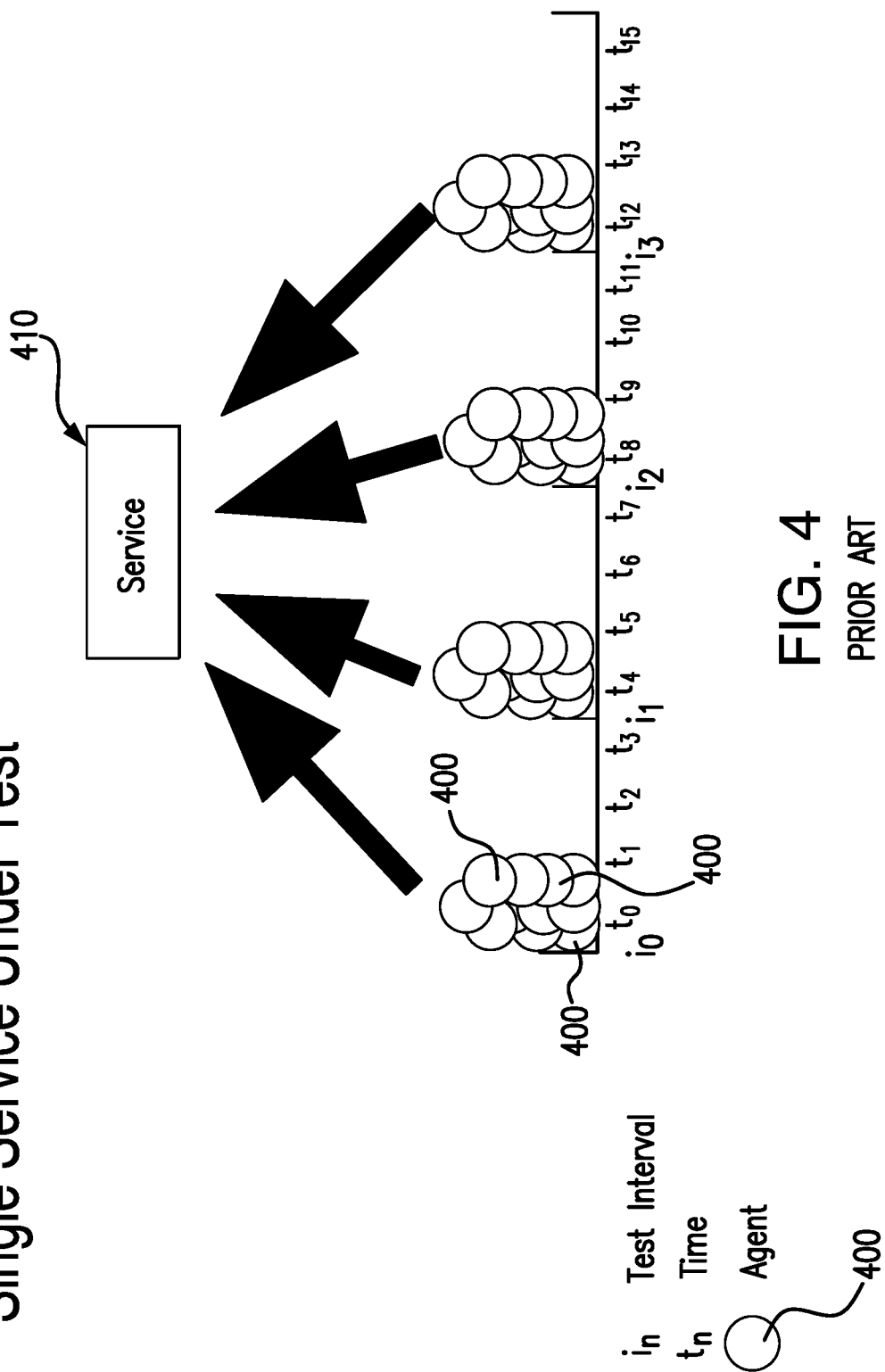
FIG. 4 illustrates the testing of a single network service by a plurality of network test agents in accordance with prior art methods.

With reference now to FIG. 3, and in accordance with the above described illustrated embodiments utilizing aggregated traffic from a plurality of network test agents (e.g., network test agents/probes (103, 106)), depicted are results indicating the impact of utilization of a plurality of test agents 300 conducting a network performance test of a single network service 310 which obviates overloading of the network service 310 being tested. For instance, and as indicated in FIG. 3, there is no concentrated overlap of test agents 300 as they are placed in distributed test intervals ($i_n$), with each test agent 300 distributed in the defined test intervals ($i_n$) also being assigned a certain time period ($t_n$) within each defined test interval ($i_n$) to obviate concentrated overlap of test agents 300, which consequently causes overload of the network service 310 being tested. This is in contrast to what is depicted in FIG. 4 illustrating prior art methods and systems for conducting a network performance test of a single network service 410 in which network test agents are overlapped in a concentered arrangement in each test intervals ($i_n$). As shown, the network test agents 400 are not evenly distributed amongst time period ($t_n$) segmentations in each test interval ($i_n$), which consequently often causes overload, and severe degradation of the service provided by the network service 410 being tested.

With reference now to FIG. 5, and in accordance with the above described illustrated embodiments, described is an individual network test agent (e.g., network test agents/probes (103, 106) utilized to conduct multiple network tests. Depicted in FIG. 5 are the results indicating the impact of utilization of an individual test agent conducting a plurality of network tests 500, which obviates overloading of the computer processing constraints of the individual test agent conducting the plurality of tests 500. For instance, and as indicated in FIG. 5, there is no concentrated overlap of network tests 500 being conducted by a network test agent as each network test 500 is distributed in spaced test intervals ($i_n$), and spaced apart in each test intervals ($i_n$) with a prescribed time period ($t_n$). This arrangement obviates concentrated overlap of tests 500 to be performed by an individual test agent, which consequently causes overload of the computer processing constraints of the individual test agent conducting the plurality of tests 500. This is in contrast to what is depicted in FIG. 6 illustrating prior art methods and systems for utilizing an individual network test agent (e.g., network test agents/probes (103, 106)) to conduct multiple network tests 600. Depicted in FIG. 6 are the results indicating the impact of utilization of an individual test agent to conduct a plurality of network tests 600, in accordance with prior art methods, in which the plurality of network tests 600 conducted by an individual test agent are overlapped in a concentered arrangement in each test interval ($i_n$). As shown, the plurality of network tests 600 conducted by an individual test agent are not evenly distributed amongst time period ($t_n$) segmentations in each test interval ($i_n$), which consequently causes overload, and severe degradation of the computer processing constraints provided by the individual network test agent conducting the plurality of network tests.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A network probe coupled to a communication network for implementing a software test agent for testing the communication network utilizing decentralized scheduling of a plurality of test agents for testing one or more network services on the communication network, comprising:
   a memory configured to store instructions;
   a processor disposed in communication with said memory, wherein said processor upon execution of the instructions is configured to:
   determine an optimal time period by using a unique identifier for the test agent for executing a test by the test agent of a network service upon the communication network without requiring knowledge of other test agents conducting other tests upon the communication network, wherein each test of the computer network is assigned a unique identifier;
   determine a deterministic decentralized scheduling of the test agent without requiring centralized coordination of other individual agent test schedules conducted by other test agents;
   determine a test schedule for the test agent based upon the determined decentralized scheduling.

2. The computer system as recited in claim 1, wherein each of the plurality of test agents conduct a test upon the computer network that is different than one or more other tests being performed by other test agents upon the computer network.

3. The computer system as recited in claim 1, wherein the test agent consists of a network monitoring device.

4. The computer system as recited in claim 1, wherein the test agent is configured to determine a test schedule for a network test independent of one or more test schedules determined by other test agents.

* * * * *